(12) United States Patent
Kunz et al.

(10) Patent No.: US 7,036,824 B2
(45) Date of Patent: May 2, 2006

(54) DEVICE FOR THE FLOAT MOUNTING A SEALED HOUSING

(75) Inventors: Alfred Kunz, Witterswil (CH); Jörg List, Portalban (CH)

(73) Assignee: List AG, Arisdorf (CH)

( * ) Notice: Subject to any disclaimer, the term of this patent is extended or adjusted under 35 U.S.C. 154(b) by 55 days.

(21) Appl. No.: 10/479,502

(22) PCT Filed: Apr. 29, 2002

(86) PCT No.: PCT/EP02/04698

§ 371 (c)(1),
(2), (4) Date: Dec. 2, 2003

(87) PCT Pub. No.: WO02/101268

PCT Pub. Date: Dec. 19, 2002

(65) Prior Publication Data

US 2004/0183258 A1    Sep. 23, 2004

(30) Foreign Application Priority Data

Jun. 8, 2001   (DE) .............................. 101 27 849

(51) Int. Cl.
*F16J 15/18*    (2006.01)

(52) U.S. Cl. ................. 277/503; 277/520; 277/545; 277/578

(58) Field of Classification Search ........ 277/503–505, 277/508, 518, 520–522, 545, 578
See application file for complete search history.

(56) References Cited

U.S. PATENT DOCUMENTS

| | | | | |
|---|---|---|---|---|
| 711,176 | A * | 10/1902 | Prusek ........................ | 277/508 |
| 1,565,632 | A * | 12/1925 | Fish ............................ | 384/218 |
| 2,272,455 | A * | 2/1942 | Withington .................. | 277/545 |
| 2,469,078 | A * | 5/1949 | Robison ...................... | 277/545 |
| 3,458,208 | A * | 7/1969 | Jung ........................... | 277/548 |
| 3,759,533 | A * | 9/1973 | Neely .......................... | 277/545 |
| 3,822,739 | A * | 7/1974 | Kurschner .................... | 165/9 |
| 4,408,769 | A * | 10/1983 | Wolff ........................ | 277/504 |
| 4,554,748 | A * | 11/1985 | Nixon, Jr. .................... | 34/242 |
| 4,795,170 | A * | 1/1989 | Kokkonen et al. .......... | 277/504 |
| 4,875,691 | A * | 10/1989 | Kosi ........................... | 277/545 |
| 5,048,847 | A * | 9/1991 | Kovacs et al. .............. | 277/318 |
| 6,270,247 | B1 * | 8/2001 | Tschopp ..................... | 366/289 |
| 6,354,597 | B1 * | 3/2002 | Garnier et al. .............. | 277/508 |

FOREIGN PATENT DOCUMENTS

SU              1774106         * 11/1992

* cited by examiner

*Primary Examiner*—Alison K. Pickard
(74) *Attorney, Agent, or Firm*—Bachman & LaPointe, P.C.

(57) ABSTRACT

A device for float mounting a sealed housing around a rotating, deflecting shaft. A sealed housing is connected to a static part in such a way that it can yield radially as well as rotate around a shaft axis at least to a small extent.

11 Claims, 2 Drawing Sheets

DEVICE FOR THE FLOAT MOUNTING A SEALED HOUSING

BACKGROUND OF THE INVENTION

The invention relates to a device for the floating mounting of a sealing housing about a rotating, deflecting shaft and with respect to a static part.

In very many technical spheres, a shaft is held in its entirety or via a shaft journal in a bearing in which the shaft rotates. This generally also involves shaft passages through a sealing housing where the intention is to prevent a medium from, for example, a space in which the shaft rotates from passing to the outside via the seal.

Floating seals of this type are exposed to diverse forces which stress and wear the sealing elements. In the event of wear, the corresponding sealing elements have to be easily replaceable.

Radial forces, and forces which act torsionally and axially can be mentioned in particular as the forces which act on a floating seal of this type.

The present invention is concerned, in particular, but in no way exclusively, with "mixing kneaders" for the mechanical and/or thermal treatment of products in a liquid, pasty and/or powdery state with or without the supply and removal of gases and/or steam, having a housing and a shaft which rotates about an axis of rotation in the housing and on which kneading elements are provided distributed in the axial direction. For example, a mixing kneader of this type is described in EP 0 422 454 B1. The shaft with the kneading elements is supported via shaft journals in "rolling bearings", in which at least one packing of sealing material is inserted and compressed in a sealing housing between the shaft, the dynamic part, and the housing, the static part, which causes the sealing packing to nestle tightly against the sliding surface.

Sealing housings of this type have to be mounted flexibly in order to absorb movements of the shaft. This has taken place up to now via corresponding bellows connections between the sealing housing and the static part, but these bellows connections are likewise subject to a considerable wear and break apart over the course of time because of fatigue.

It is an object of the present invention to provide a device of the above-mentioned type, wherein the forces which occur are absorbed to a suitable extent, but the wearing parts can easily be exchanged.

SUMMARY OF THE INVENTION

The foregoing object is achieved by providing a sealing housing which is connected to a static part in both a radially deflectable manner and in a manner as to allow it to rotate, at least to a small extent, about a shaft axis.

The connection is preferably undertaken by a curved spring between the sealing housing and the static part. This curved spring is to at least partially encompass the bearing housing at a distance, with, preferably, two semicircular curved springs being provided which are secured in each case in a mount on the static part and in a bearing block on the sealing housing. These curved springs have the considerable advantage of being relatively soft radially, i.e. they yield to a radial movement of the shaft journal. In contrast, they counteract torsional forces, in particular if the direction of rotation and the arrangement of the curved springs are selected in such a manner that the curved springs are subjected to a tensile stress.

A round bar which is under prestress is preferably used as the curved spring, but other springs and, in a suitable arrangement, cable pulls are also conceivable here.

For the sake of simplicity, the curved spring is secured in the mount or on the bearing block by means of a cross bolt which crosses the bearing block or the mount and engages in a depression in the curved spring. All that then needs to be done in order to release the curved spring is to remove the cross bolt from the mount or the bearing block.

In a further exemplary embodiment of the invention, for which protection is also to be requested separately, provision is made for the sealing housing to be able to be moved axially at least to a small extent along the shaft. This means that axial forces which act on the bearing housing are also absorbed. These include, in particular, forces as a consequence of differences in the thermal expansion.

In this case, an outer flange which is assigned to the sealing housing engages between an end flange on the static part and a ring connected to the end flange at a distance. That is to say, this ring also belongs to the static part. The outer flange is then supported, on the one hand, against springs which are situated in the ring and, on the other hand, it presses with sealing rings against the end flange.

The above-mentioned mount for the curved spring is preferably likewise secured on the ring, specifically on the other side of the springs which press against the outer flange.

The above-mentioned bearing block for the curved springs preferably sits on the half ring which reaches under the mount at a distance from the ring on the static part. In this case, two half rings interact, each half ring having a bearing block and a curved spring. The forces are therefore absorbed in a very favorable manner.

The half rings serve at the same time to connect a sleeve section, which also has the above-mentioned outer flange, to the other sleeve sections of the sealing housing. In this case, some of these sleeve sections are supported with respect to the shaft by means of sealing assemblies while the other sleeve sections reach under the sleeve sections which have just been mentioned and thus, when pulled together by tension rods, compress the sealing assemblies, resulting in the production of the stuffing box.

The entire device is constructed in such a manner that a rapid exchange of the sealing assembly is possible. Only the two curved springs are visible on the outside, which means that possible damage to these curved springs can immediately be recognized. It should be emphasized that the curved springs do not have any contact with the product.

The possibility of radial yielding means that the frictional heat which arises between the seal and shaft is greatly reduced. This also, in turn, prolongs the service life of the entire device. Eccentricities can easily be compensated for by the selected mounting. An extremely large deflection is possible in relation to known mountings. Not only is the basic eccentricity between the shaft and sealing housing eliminated, but the selected mounting can also absorb considerable differences in thermal expansion.

It should also be emphasized that—in contrast to previously—the sealing assemblies themselves can be very hard and fixed, since they no longer have to yield to a movement of the shaft.

BRIEF DESCRIPTION OF THE DRAWINGS

Further advantages, features and details of the invention emerge from the following description of preferred exemplary embodiments and with reference to the drawing wherein.

DETAILED DESCRIPTION

Figure 1:
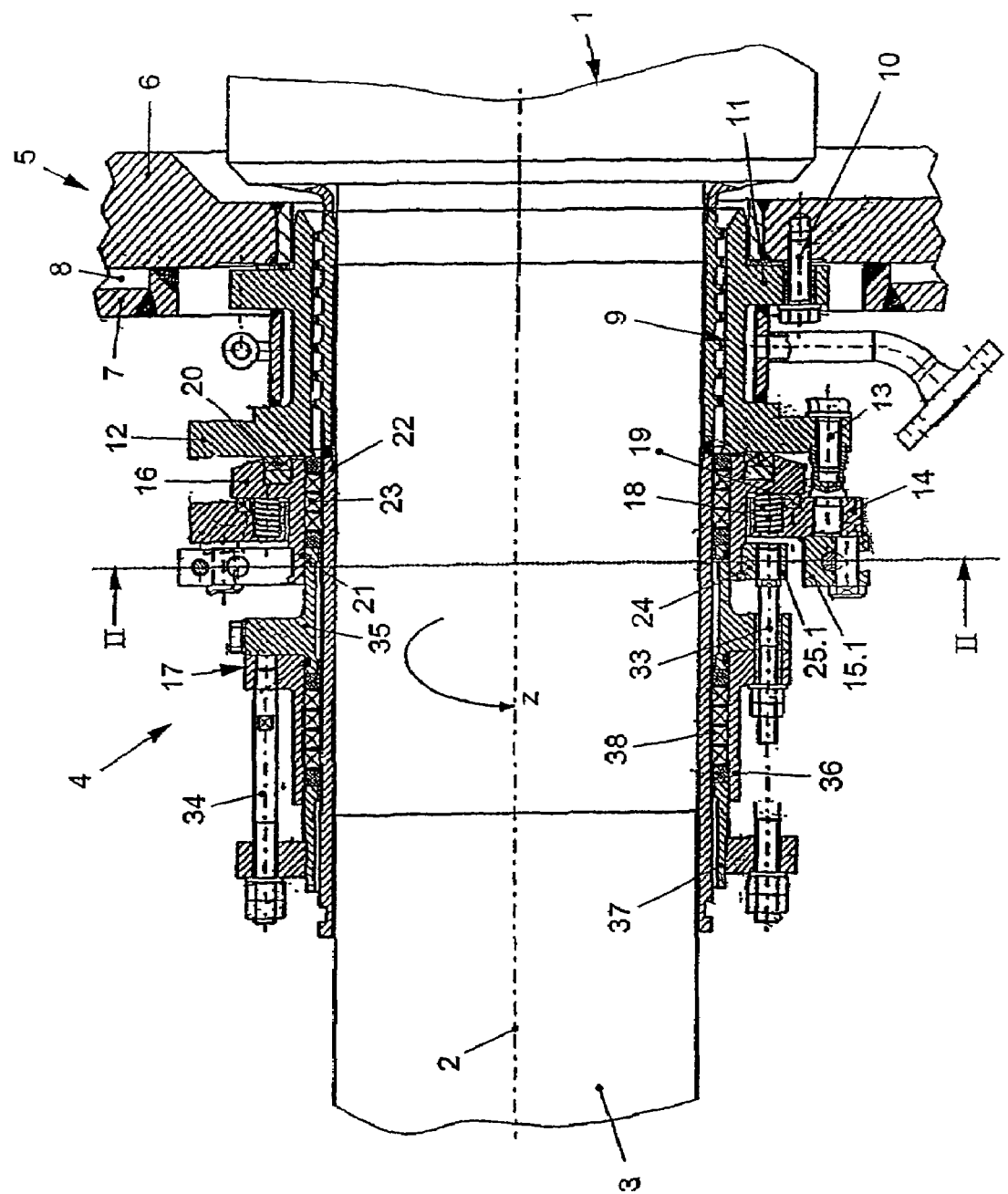
FIG. 1: shows a longitudinal section through a device for mounting a seal on a rotatable shaft.

According to FIG. 1, a shaft 1 rotates about a longitudinal axis 2 in the direction of rotation z. In the process, the shaft 1 engages by means of a shaft journal 3 in a floating double stuffing box 4 which is secured on a static part 5. This static part 5 has a cylindrical housing, of which only part of the end wall 6 is shown. This cylindrical housing is preferably surrounded by an outer casing 7, it being possible for a medium for heating the cylindrical housing to be guided in free spaces 8 between the outer casing 7 and cylindrical housing.

A sleeve section 9, as a further element of the static part, is connected to the end wall 6 via corresponding screw bolts 10, a flange 11 bearing against the end wall 6.

Figure 2:
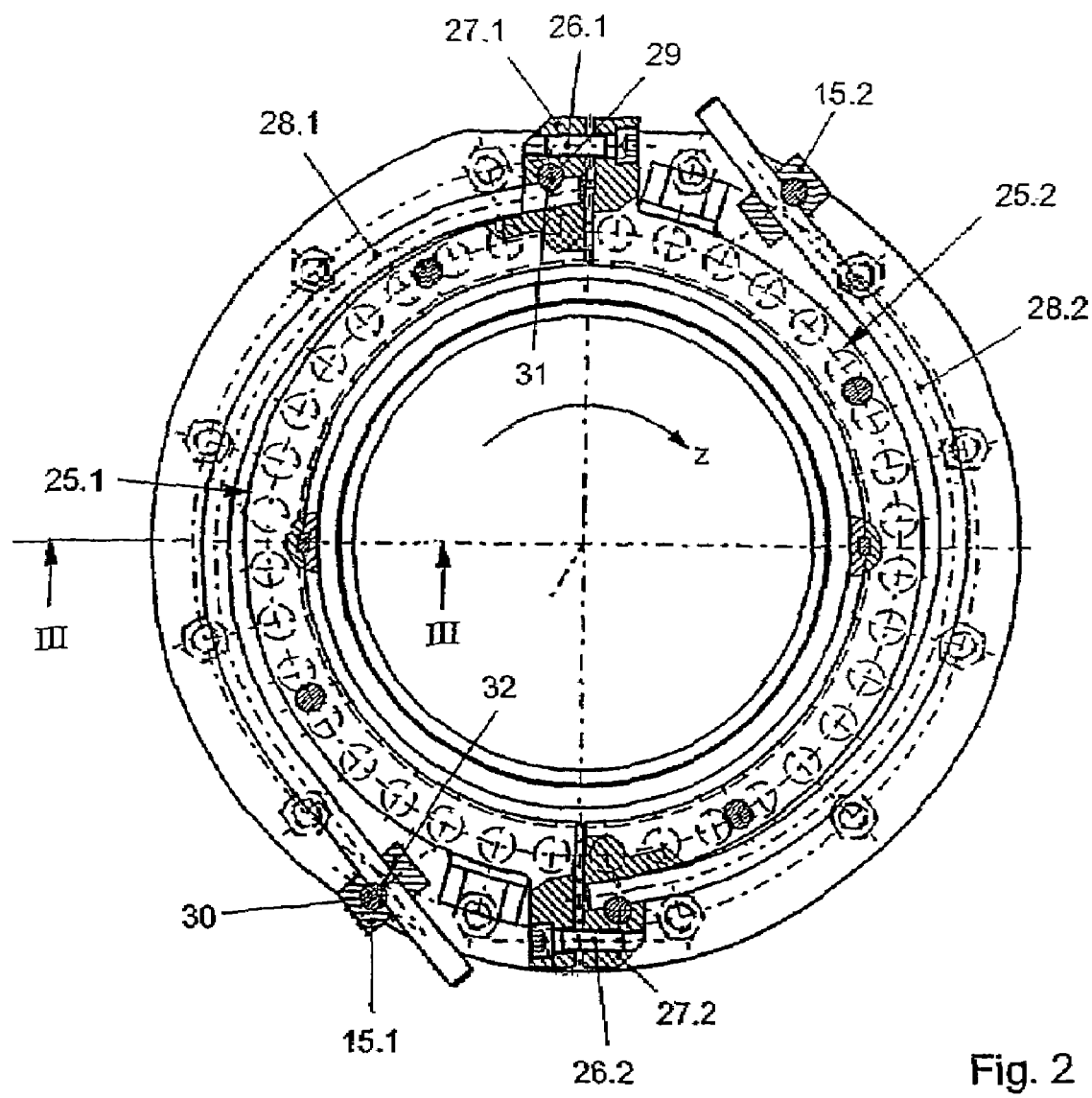
FIG. 2: shows a cross section through the device according to FIG. 1 along the line II—II.

An end flange 12 against which the floating double stuffing box 4 strikes is provided at a distance from the flange 11. Furthermore, as a further part of the static part 5, a ring 14 is connected to the end flange 12 via corresponding screw bolts 13 and two mounts 15.1 and 15.2 (see FIG. 2) are situated on it. These mounts 15.1 and 15.2 therefore likewise belong to the static part 5.

An outer flange 16, as part of a sealing housing 17 (secondary sealing housing), engages between the ring 14 and the end flange 12. This outer flange 16 is pressed against the end flange 12 by means of a helical spring 18 and a piston ring 19, which are mounted in the ring 14, for static sealing by means of a sealing assembly 20.

The outer flange 16 is part of a primary stuffing box 21 which is part of the secondary sealing housing 17. This primary stuffing box 21 encompasses a wearing sleeve 22 of the shaft 1 with the interposition of a sealing assembly 23. In this case, it extends through at a distance below the ring 14.

On the other side of the ring 14, the primary sealing housing 21 has an annular groove 24 in which two half rings 25.1 and 25.2 sit. The two half rings 25.1 and 25.2 are connected to each other at their ends via screw bolts 26.1 and 26.2 which are used to obtain a clamping action with which the half rings 25.1 and 25.2 sit in the annular groove 24. In this case, each screw bolt 26.1 and 26.2 engages in a bearing block 27.1 and 27.2 on the other half ring 25.2 and 25.1, respectively. This bearing block 27.1 or 27.2 serves to secure a curved spring 28.1 or 28.2 which encompasses the particular half ring 25.1 or 25.2 at a distance and is secured on both sides in the mount 15.1 or 15.2.

The fastening of the curved spring 28.1 or 28.2 takes place via a cross bolt 29 or 30 in each case which crosses the bearing block or the mount and sits in a depression 31 or 32 which is formed in the curved spring 28.1 or 28.2.

The half rings 25.1 and 25.2 are connected via tension rods 33 and 34, respectively, to further secondary sealing housings 35, 36 and 37 of the secondary sealing housing 17, the sealing housing 36 being supported again against the wearing sleeve 22 via a sealing assembly 38.

The manner in which the present invention functions is as follows:

The shaft journal 3 has to be able to rotate with its wearing sleeve 22 in an unobstructed manner in the sealing housing 17, which is permitted by the sealing assemblies 23 and 38.

In the process, the forces which originate from the shaft journal 3 are to be absorbed by the floating double stuffing box 4. These are sometimes radial forces which originate from the shaft journal 3. These are gently cushioned by the curved springs.

Furthermore, circulating forces are also, however, absorbed by the curved springs when the shaft journal rotates in the direction z. In this case, the curved springs are subjected to a tensile stress, so that they eliminate the circulating forces caused by the friction of the primary and secondary seals.

Moreover, radial and circulating forces are absorbed over the entire 360° region of rotation, with the result that the desired deflection possibility is also provided over this entire region.

If axial forces, in particular forces of thermal expansion, are also to be absorbed, then this takes place through the secondary sealing housing 17 being able to move axially with respect to the end flange 12 of the static part, in which case the outer flange 16 is supported, on the one hand, against the helical spring 18 and the piston ring 19 and, on the other hand, against the sealing assembly 20.

Above all, the easy possibility of exchanging the sealing assemblies 20, 23 and 38 should also be mentioned in terms of the functionality. It suffices to release the tension rods 33 and 34 in order to get to the sealing assembly 38. Furthermore, it suffices to loosen the screw bolts 26.1, and 26.2 in order for the half rings 25.1 and 25.2 to be able to be opened. After removal of the cross bolt 30, the curved springs 28.1 and 28.2 can also be pulled out of the mounts 15.1 and 15.2.

After loosening the screw bolts 13, the ring 14 is also opened up, so that the sleeve section 21 can be removed from the shaft journal 3. This opens up the sealing assemblies 23 and 20.

Assembly takes place in the reverse sequence.

The invention claimed is:

1. A device comprising a static part (5), a sealing housing (17), and mount means for floating mounting of the sealing housing (17) about a deflecting shaft (1), rotating about a shaft axis (2) wherein the, sealing housing (17) is connected to the static part (5) in a manner to allow for both radial deflection and rotation about the shaft axis (2), wherein the mount means (15.1, 15.2) is provided on the static part (5) for mounting a curved spring (28.1, 28.2) which partially encompasses the sealing housing (17), wherein the curved spring (28.1, 28.2) engages in a bearing block (27.1, 27.2) on the sealing housing (17) and is held there by a cross bolt (29) sitting in a depression (31) in the curved spring (28.1, 28.2).

2. The device as claimed in claim 1, wherein the curved spring (28.1, 28.2) is a round bar under prestress.

3. The device as claimed in claim 1, wherein the bearing block (27.1, 27.2) for the curved spring (28.1, 28.2) sits on a half ring (25.1, 25.2) which extends under the mount means (15.1, 15.2).

4. The device as claimed in claim 3, further including two half rings (25.1, 25.2) with a respective bearing block (27.1, 27.2) and two curved springs (28.1, 28.2), wherein the half rings are connected to each other in the region of the bearing blocks (27.1, 27.2).

5. The device as claimed in claim 4, wherein the half rings (25.1, 25.2) sit in an annular groove (24) on a primary stuffing box (21) of the sealing housing (17), wherein the outer flange (16) protrudes and engages between the ring (14) and end flange (12).

6. The device as claimed in claim 5, wherein the primary stuffing box (21) is supported against a wearing sleeve (22) by a sealing assembly (23).

7. The device as claimed in claim 6, wherein further sealing housings (35, 36, 37) are connected to the half rings (25.1, 25.2) and to the primary stuffing box (21) by tension rods (33, 34) which are supported against the wearing sleeve (22.

8. A device comprising a static part (5), a sealing housing (17), and mount means for floating mounting of the sealing housing (17) about a deflecting shaft (1), rotating about a shaft axis (2) wherein the, sealing housing (17) is connected to the static part (5) in a manner to allow for both radial deflection and rotation about the shaft axis (2), wherein the mount means (15.1, 15.2) is provided on the static part (5) for mounting a curved spring (28.1, 28.2) which partially encompasses the sealing housing (17), wherein an outer flange (16) is provided on the sealing housing (17) and engages between an end flange (12) on the static part (5) and a ring (14) which is connected to the end flange (12).

9. The device as claimed in claim 8, wherein the curved spring (28.1, 28.2) is secured in the mount means (15.1, 15.2) on the static part (5) by a cross bolt (30) which sits in a depression (32) in the curved spring (28.1, 28.2).

10. The device as claimed in claim 8, wherein the outer flange (16) is supported against springs (18) in the ring (14).

11. The device as claimed in claim 8, wherein the outer flange (16) is supported against the end flange (12) by sealing rings (20).

* * * * *